UNITED STATES PATENT OFFICE.

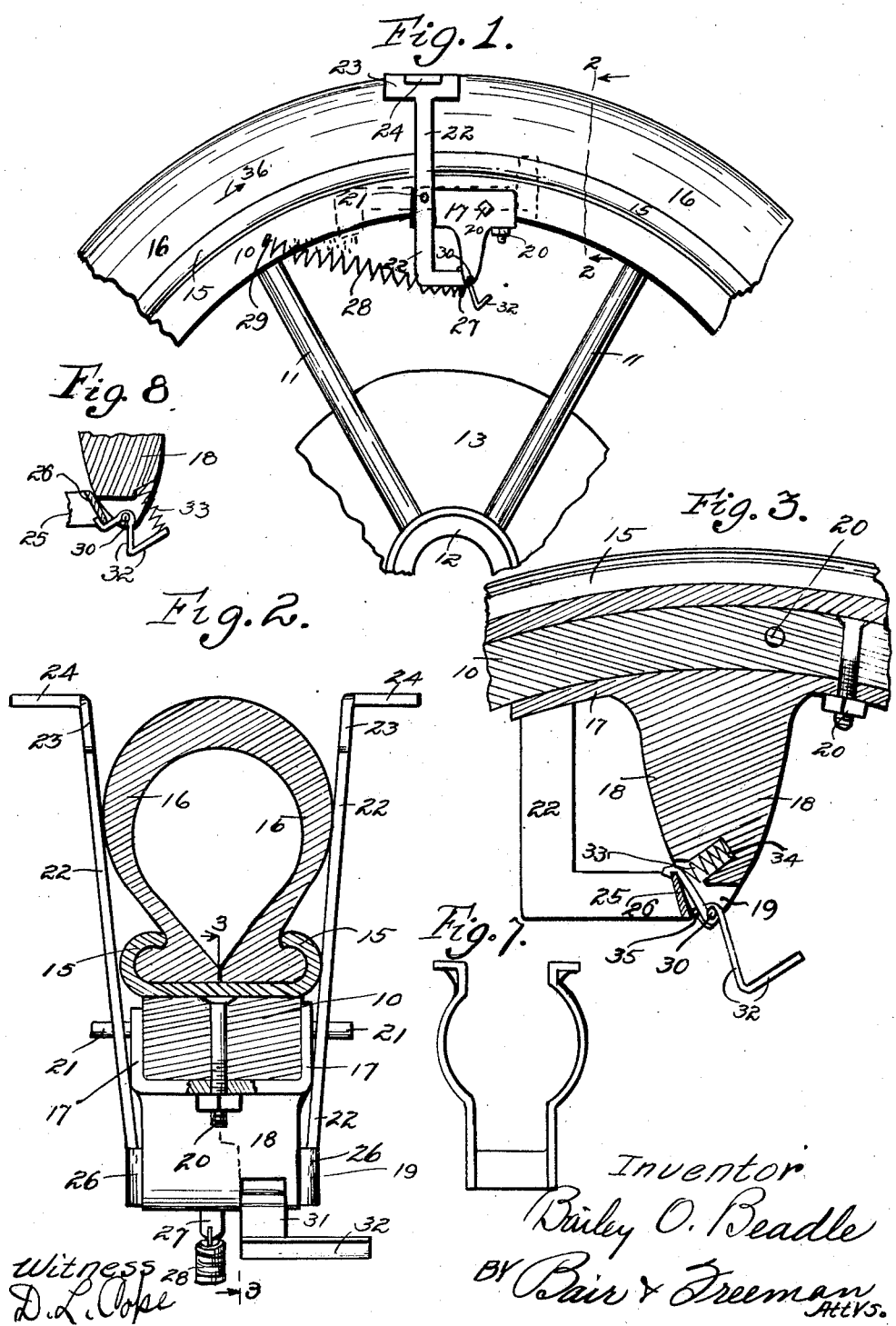

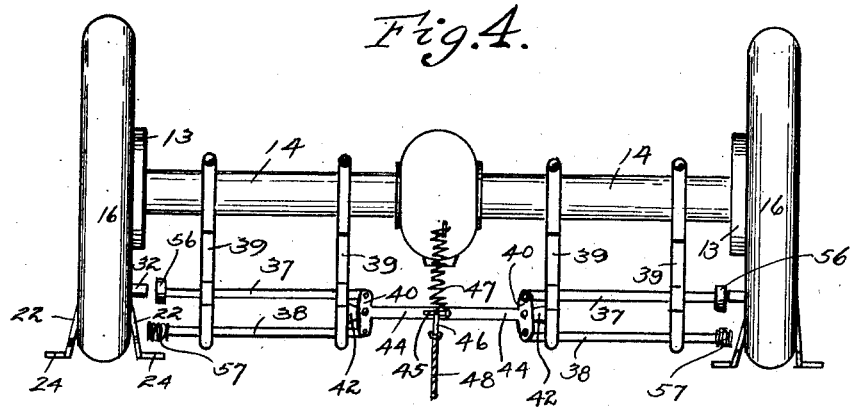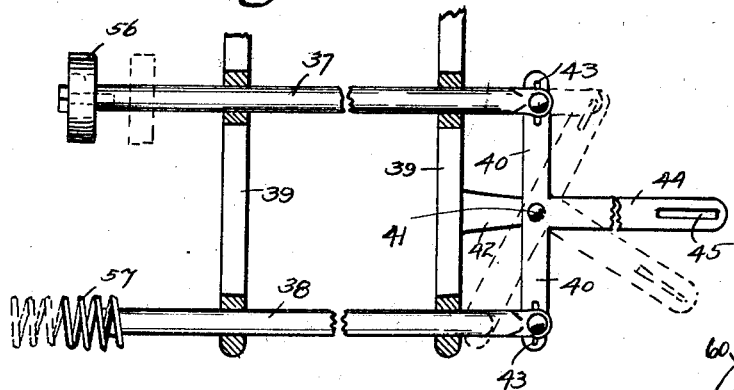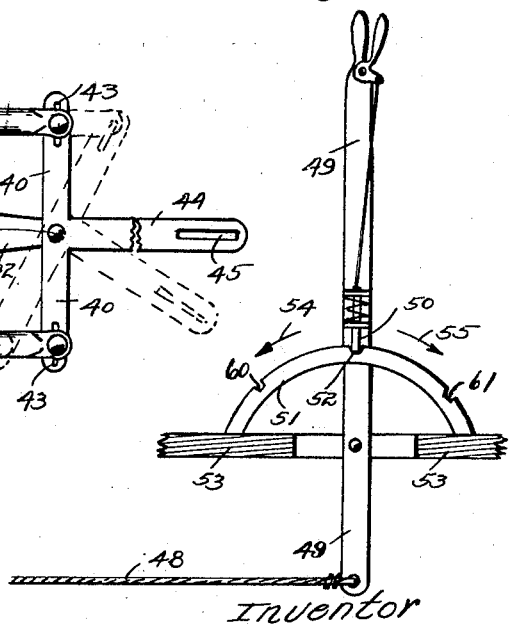

BAILEY OWEN BEADLE, OF ATLANTIC, IOWA.

NON-SKID DEVICE.

1,394,268.  Specification of Letters Patent.  Patented Oct. 18, 1921.

Application filed November 26, 1920. Serial No. 426,591.

*To all whom it may concern:*

Be it known that I, BAILEY OWEN BEADLE, a citizen of the United States, and a resident of Atlantic, in the county of Cass and State of Iowa, have invented a certain new and useful Non-Skid Device, of which the following is a specification.

The object of my invention is to provide a non-skid device that may be permanently fixed to an automobile wheel, and which is of simple, durable and inexpensive construction.

More particularly my invention relates to a device adapted to be used upon an automobile wheel for preventing it skidding, and to also give greater traction surface to the wheel when desired.

Another object is to provide such a device, that may be permanently left on the wheel, but which may be moved to various positions so that when it is desired the non-skid device may be used and when not needed may be moved to an inoperative position and out of the way.

Still another object is to provide means for controlling the position of the non-skid members from a point adjacent to the driver's seat so that the non-skid members may be moved to operative position without the necessity of the driver leaving his seat, or may be moved from operative position back to inoperative position when the non-skid members are no longer needed.

With these and other objects in view my invention consists in the construction, arrangement and combination of the various parts of my device, whereby the objects contemplated are attained, as hereinafter more fully set forth, pointed out in my claims and illustrated in the accompanying drawings in which:

Figure 1 is a side elevation of my device, shown attached to a portion of a wheel.

Fig. 2 is a sectional view taken on the line 2—2 of Fig. 1.

Fig. 3 is a central, vertical, sectional view taken on the line 3—3 of Fig. 2.

Fig. 4 is a top, plan view of the rear axle housing with the devices attached thereto for moving the non-skid members of various positions.

Fig. 5 is an enlarged view of the device used for either moving the non-skid member to operative position or to inoperative position.
Fig. 6 is a side elevation of the lever control for operating the devices shown in Fig. 4.

Fig. 7 is a side elevation of the non-skid members shown in a slightly modified form;
and Fig. 8 is a slightly modified form of catch device for holding the non-skid members in position.

In the accompanying drawings I have used the reference numeral 10 to indicate an ordinary felly of a wheel, which is provided with the spokes 11, and the hub 12. A brake drum housing 13 is fixed to the hub 12 and spokes 11 in the ordinary manner. The rear axle housing is indicated by the reference numeral 14. The rim 15 is mounted on the felly 10 and receives the tire casing 16.

My device is adapted to be permanently fixed to the felly 10 and comprises a clamp member 17, which rests snugly against the felly 10, and is provided with an inwardly extending projection 18.

The projection 18 is provided with an opening in its inner edge 19, the purpose of which will be hereafter more fully set forth.

Bolts 20 hold the clamp members 17 to the felly 10. The clamp members 17 are provided with pins 21 which extend outwardly from both sides thereof. Non-skid members 22 are pivotally mounted on the pins 21. Each of the non-skid members are provided with a pair of arms having outwardly extending flanges 23 at their outer ends, and a flange 24 which projects out from the side of each of the arms of the non-skid member.

The inner end of the arms of the non-skid member 22 are provided with an extension 25. The free ends of the extension are connected together by a cross piece 26, as shown in Figs. 2 and 3 of the drawings.

The non-skid members 22 are free to swing upon the pins 21 as their axis. The cross piece 26 limiting the movement in one direction, when it strikes against the inner side of the felly 10.

Movement of the non-skid member in the opposite direction is limited by the projection 18 of the clamp members 17.

The cross piece 26 is provided with a short lug 27 to which is fixed one end of a spring 28. The free end of the spring 28 is fixed to a hook 29 on one side of the felly 10.

The spring 28 tends to hold the non-skid members in the position shown in dotted lines in Fig. 1 of the drawings.

A pin 30 is fixed to the member 18 and extends across the opening 19. A hook member 31 is pivoted on the pin 30 and is provided with an inwardly extending flange member 32, as shown in Fig. 2 of the drawings.

A spring 33 has one end resting against the hook 31 and its other end received in a recess 34 formed in the side of the member 18.

A stop member 35 is provided in the opening 19 for limiting the movement of the hook 31 in one direction. The spring 33 will normally push against the hook 31 and hold it against the stop 35.

A portion of the hook 31 is curved and designed to engage the cross piece 26 for thus holding the non-skid members in their operative position, as shown in Fig. 1 of the drawings. When in this position the flanges 24 serve as additional traction surface, while the flange 23 prevents sidewise skidding of the wheels.

The hook 31 when it engages the non-skid members 22 holds them against the action of the springs 28.

It will be understood that I have shown only a single non-skid member in Fig. 1, but it is my intention of using as many non-skid members on each wheel as is desired. One non-skid member may be placed between each set of spokes as desired.

The wheel as shown in Fig. 1 moves in the direction indicated by the arrow 36.

In order to successfully operate my non-skid members from the driver's seat I have provided pairs of shafts 37 and 38 which are journaled in bearings 39, which are fixed to the axle housing 14.

The shafts 37 and 38 are capable of sliding longitudinally within the bearings.

The inner ends of the shafts 37 and 38 are pivotally connected to a lever member 40 pivoted at 41 on a lug 42. The lug 42 is formed on one of the bearing members 39.

The ends of the lever 40 are provided with slots 43 so as to permit the movement of the lever to the position shown in dotted lines for sliding the shafts 37 and 38.

The lever 40 is provided with an arm 44 which is also provided with a slot 45. The arms 44 of the levers 40 have their inner ends overlap so that the slots 45 register with each other as shown in Fig. 4 of the drawings.

A link 46 extends through the slots 45. One end of the link 46 is fastened to a spring 47 which is anchored to the axle housing 14. A cable 48 is fixed to the other end of the link 46.

In order to move the levers 40, I have provided a lever 49 which is provided with a spring actuated pawl 50. A sector 51 provided with a notch 52 in its center is fixed to the floor 53 of an automobile. Notches 60 and 61 are also provided in the sector.

The lower end of the lever 49 which extends below the floor 53 is provided with an opening through which is extended the free end of the cable 48.

When the lever 49 is moved in the direction indicated by the arrow 54 it will cause the lever 40 to be moved to the position shown in dotted lines in Fig. 5 of the drawings. Thus causing the shaft 38 to be moved outwardly while the shaft 37 is moved in the opposite direction.

The spring 47 will return the lever to its upright position as shown in Fig. 6 of the drawings. Thus returning the shafts 37 and 38 to their inoperative positions.

When the lever 49 is moved in the direction indicated by the arrow 55 then the spring 47 will cause the lever 40 to be moved in the opposite direction from that shown in dotted lines in Fig. 5; and cause the shaft 37 to be moved outwardly while the shaft 38 will be moved inwardly.

Rollers 56 are rotatably mounted on the shafts 37 on their outer ends. The rollers 56 are designed to engage the flanges 32 of the hook members 31, that is when the shaft 37 is moved to its outward limited movement. The rotation of the wheels will bring each of the hook members in engagement with the rollers 56 thus causing the hook member to be moved against the action of the spring 33, and releasing the cross piece 26 of the non-skid members therefrom. The spring 28 will then immediately pull the non-skid members to position shown in dotted lines in Fig. 1 of the drawings.

When the wheel has made a complete revolution half of the non-skid members will have been released and all of them will be in their inoperative position. The lever 49 which controls the shafts 37 may then be moved to position where the pawl 50 will engage the notch 52.

When it is desired to again place the non-skid device in operative position then the lever 49 is moved so that the shafts 38 will be moved outwardly. Each of the outer ends of the shafts 38 are provided with a coil spring 57. The coil spring 57 will engage the non-skid members below the pins 21 and hold them so that they will be moved to their operative position.

The hook 31 will engage the non-skid members and lock them in their operative position. The spring 57 is stronger than the spring 28. The spring 57, after the non-skid members 22 have been raised to their operative position will become disengaged, due to the rotation of the wheel.

The spring 57 will almost rest against the inner side of the felly 10.

The spring 57 provides such a connection between the shaft 38 and the non-skid member 22 so as to permit it to be raised to its raised position, and yet after it is raised to position, the spring 57 will give enough so as to slip by the non-skid member and be ready to engage the next one.

After all the non-skid members are raised then the lever 49 is moved to its neutral position.

It will be seen that I have provided a device that may readily and easily be controlled from a point adjacent to the driver's seat, and I am able to install or remove non-skid devices without the necessity of leaving the automobile.

Another advantage is the simplicity of the device and its method of controlling.

Fig. 7 shows the non-skid members having their sides curved so as to conform to the curved sides of the tire.

My non-skid members when in this form do not engage the tire, hence there is no wear on the sides of the tire casing. The non-skid members may be provided with reinforcing ribs or the like.

Some changes may be made in the construction and arrangement of the various parts of my device, without departing from the essential features and purposes of my invention, and it is my intention to cover by my claims any modified forms of structure or use of mechanical equivalents which may be reasonably included within their scope.

I claim as my invention:

1. In a device of the class described, non-skid members pivotally mounted on the wheels of an automobile, members for locking said non-skid members in operative position, yielding means for holding said non-skid members in inoperative position, and means for either moving said non-skid members from operative to inoperative, or inoperative to operative positions, said last means including a pair of shafts slidably mounted, a pivoted lever pivoted to the ends of said shafts whereby movement of said lever will impart a sliding movement to said shafts in opposite directions, the free ends of said shafts being provided with members designed to engage the non-skid members, a second lever operatively connected with said first lever and a locking member for holding said shafts out of engagement with said non-skid members.

2. In a device of the class described, non-skid members pivotally mounted on the wheels of an automobile, members for locking said non-skid members in operative position, yielding means for holding said non-skid members in inoperative position, and means for moving said non-skid members from inoperative to operative position, said last means being controlled from a lever adjacent to the driver's seat.

3. In a device of the class described, non-skid members pivotally mounted on the wheels of an automobile, members for locking said non-skid members in operative position, yielding means for holding said non-skid members in inoperative position, and means for either moving said non-skid members from operative position to inoperative position, or inoperative to operative position, said last means including a pair of shafts slidably mounted, a pivoted lever pivoted to the ends of said shafts whereby movement of said lever will impart a sliding movement to said shafts in opposite directions, the free ends of said shafts being provided with members designed to engage the non-skid members, a spring for moving said lever in one direction and a second lever for moving said first lever in the opposite direction.

4. In a device of the class described, non-skid members pivotally mounted on the wheels of an automobile, members for locking said non-skid members in operative position, yielding means for holding said non-skid members in inoperative position, means for moving said non-skid members from inoperative to operative position, and means for releasing said non-skid members from operative position, said last means being controlled from a lever adjacent to the driver's seat.

5. In a device of the class described, non-skid members pivotally mounted on the wheels of an automobile, members for locking said non-skid members in operative position, yielding means for holding said non-skid members in inoperative position, means for moving said non-skid members from inoperative to operative position, means for releasing said non-skid members from operative position, and a lever for manually controlling the position of said non-skid members.

6. In a device of the class described, clamps fixed to an automobile wheel, non-skid members pivoted to said clamps and capable of being moved to operative or inoperative positions, springs for yieldingly holding said non-skid members in inoperative position and a hook pivoted to each of said clamps designed to engage said non-skid members for locking them in their operative position.

7. In a device of the class described, clamps fixed to an automobile wheel, non-skid members pivoted to said clamps and capable of being moved to operative or inoperative positions, springs for yieldingly holding said non-skid members in inoperative position and a hook pivoted to each of said clamps designed to engage said non-skid members for locking them in their operative position, and means manually controlled from a point adjacent to a driver's seat for releasing said hooks and permitting the non-skid members to move to inoperative position.

8. In a device of the class described, clamps fixed to an automobile wheel, non-skid members pivoted to said clamps and capable of being moved to operative or inoperative positions, each of said non-skid members including a pair of arms connected together at their inner ends and provided with flanges at their outer ends for engaging the ground adjacent to the automobile wheel, springs for yieldingly holding said non-skid members in inoperative position and a hook pivoted to each of said clamps, designed to engage said non-skid members for locking them in their operative position.

9. In a device of the class described, non-skid members pivotally mounted on the wheels of an automobile, members for locking said non-skid members in operative position, yielding means for holding said non-skid members in inoperative position, and means for either moving said non-skid members from operative to inoperative, or inoperative to operative positions.

Des Moines, Iowa, October 15, 1920.

BAILEY OWEN BEADLE.